US012381776B1

(12) United States Patent
Muthulingam et al.

(10) Patent No.: US 12,381,776 B1
(45) Date of Patent: Aug. 5, 2025

(54) NETWORK DEVICE MANAGEMENT

(71) Applicant: Cisco Technology, Inc., San Jose, CA (US)

(72) Inventors: Hari Hara Prasad Muthulingam, Dublin, CA (US); Geetha Anandakrishnan, Freemont, CA (US); Saurabh Jain, Fremont, CA (US); Neelesh Kumar, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 337 days.

(21) Appl. No.: 17/387,837

(22) Filed: Jul. 28, 2021

Related U.S. Application Data

(60) Provisional application No. 63/152,530, filed on Feb. 23, 2021.

(51) Int. Cl.
*H04L 45/0377* (2022.01)
*H04L 41/0803* (2022.01)

(52) U.S. Cl.
CPC ................................ *H04L 41/0803* (2013.01)

(58) Field of Classification Search
CPC ............. H04L 41/0806; H04L 41/0816; H04L 41/084; H04L 41/0803; H04L 45/0377
See application file for complete search history.

(56) References Cited

U.S. PATENT DOCUMENTS

| | | | |
|---|---|---|---|
| 2010/0058329 A1* | 3/2010 | Durazzo | H04L 67/34 717/176 |
| 2014/0105062 A1 | 4/2014 | McDysan et al. | |
| 2015/0222640 A1* | 8/2015 | Kumar | H04L 47/125 370/230 |
| 2016/0043952 A1 | 2/2016 | Zhang et al. | |
| 2016/0315811 A1 | 10/2016 | Yadav et al. | |
| 2017/0099182 A1* | 4/2017 | DeBolle | H04L 63/20 |
| 2017/0099187 A1* | 4/2017 | Dale | H04L 41/0816 |
| 2017/0317932 A1 | 11/2017 | Paramasivam | |
| 2020/0076686 A1* | 3/2020 | Krug | H04L 45/74 |

OTHER PUBLICATIONS

H. Takahashi, K. Toge and T. Manabe, "Link Insertion Loss Measurement of Deployed PON," in Journal of Lightwave Technology, vol. 37, No. 4, pp. 1098-1102, 15 Feb. 15, 2019. (Year: 2019).*
Y. Zhang, J. Li, Z. Zhou and X. Liu, "Efficient Dynamic Service Maintenance for Edge Services," in IEEE Access, vol. 6, pp. 8829-8840, 2018 (Year: 2018).*
J. Liu, W. Lu, F. Zhou, P. Lu and Z. Zhu, "On Dynamic Service Function Chain Deployment and Readjustment," in IEEE Transactions on Network and Service Management, vol. 14, No. 3, pp. 543-553, Sep. 2017 (Year: 2017).*
Cisco, "Service Graph Design with Cisco Application Centric Infrastructure White Paper," Oct. 19, 2017, 83 pages.

* cited by examiner

*Primary Examiner* — Messeret F Gebre
(74) *Attorney, Agent, or Firm* — Lee & Hayes, P.C.

(57) ABSTRACT

Techniques are described for managing network devices by defining a service chain that includes a plurality of network devices, such that the service chain identifies a position of each network device with respect to other network devices. The techniques further detect a new network device becoming active on a network and identify a logical model associated with the new network device. The new network device is programmed based on the service chain and other devices already active in the service chain.

20 Claims, 6 Drawing Sheets

NETWORK DEVICE MANAGEMENT

RELATED APPLICATIONS

This application claims priority to U.S. Provisional Application No. 63/152,530, filed on Feb. 23, 2021, the entire contents of which are incorporated herein by reference.

TECHNICAL FIELD

The present disclosure relates generally to the intelligent addition and removal of

BACKGROUND

In existing systems, network devices, such as application servers, may be added to the backend pools of a load balancer. Backend pools may be a component of a load balancer and may define a group of resources that will serve traffic for a particular load balancing rule.

In these existing systems, the addition of network devices to a backend pool may be performed by an administrator using attributes such as tags, server identifier, virtual machine name, IP (Internet Protocol) address of the server, and the like. For example, network devices may be registered through one or more network platform events. In some environments, servers may go down and come back up. Additionally, new servers may be brought up and need to be added to the backend pool of a load balancer.

In some situations, it may be useful to automate the detection of various network devices and add them to a backend pool of a load balancer.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
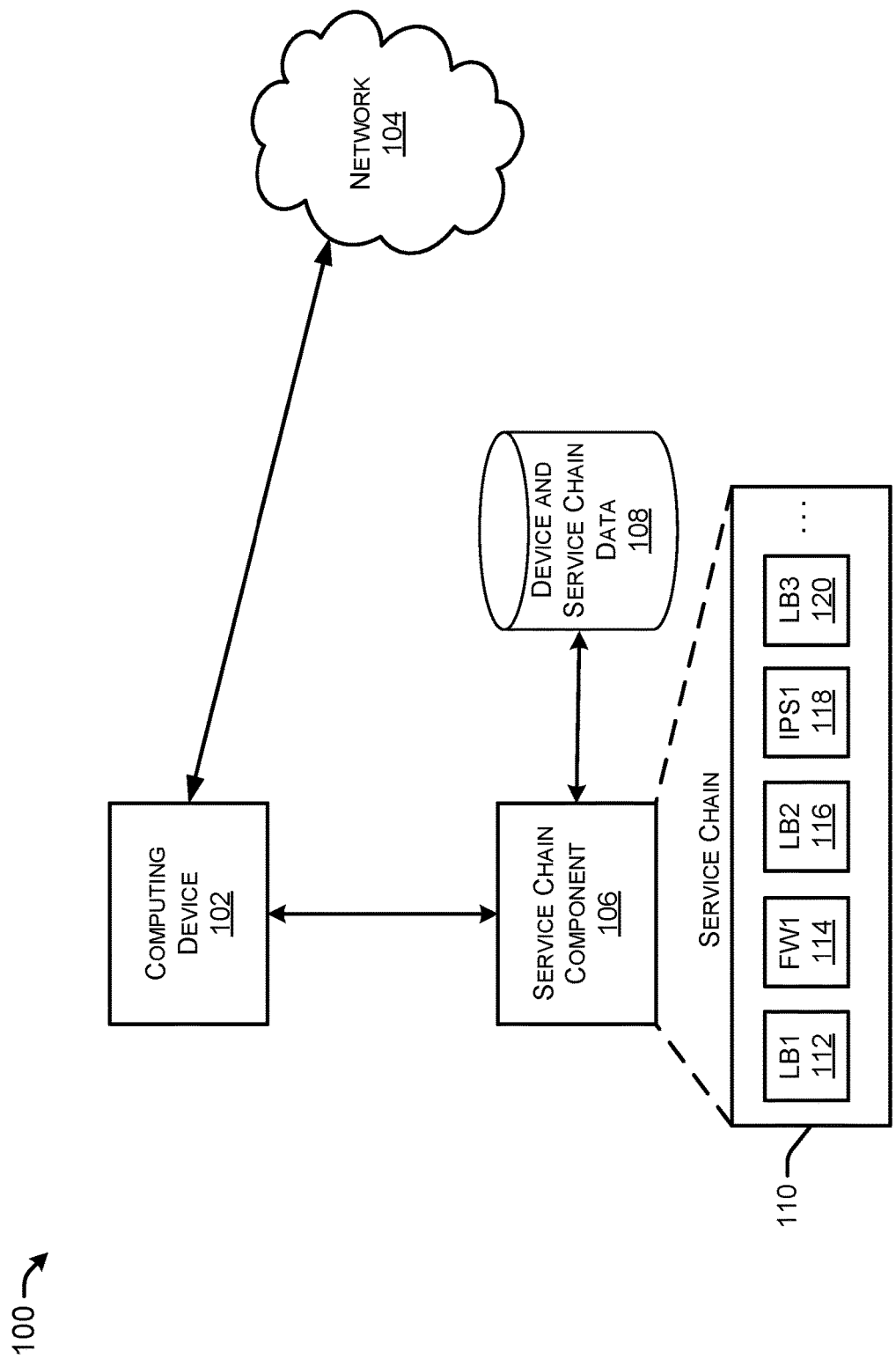
FIG. 1 illustrates a system-architecture diagram of an example environment containing one or more computing devices, service chain components, and related systems.

The systems and methods described herein automate the detection of various network devices and adding the detected network devices to a backend pool of a load balancer. For example, the network devices may be added to a load balancer in a service chain as the backend target of the load balancer. The described systems and methods support logical models of network devices and the creation of a service chain using the logical models to define positions of the network devices within the service chain.

In some situations, firewall devices may be front-ended by a load balancer for purposes such as high availability and automatic scaling. In these situations, it may be useful to detect these firewall devices and add them automatically as the target in a backend pool of the load balancer. This may support automation of the service chaining of both on-premises network devices and cloud-based devices.

The described systems and methods discover each network device that is deployed or powered up. The interfaces of the identified network device are automatically associated with the appropriate load balancer, or other devices, based on the logical model of the network device and the defined service chain. This automatic approach may simplify network operations by replacing the manual tasks (such as manual user tasks and manual user input) of managing network devices as they come up on a network with an automated process that may not need an administrator or other user.

This disclosure describes techniques for creating logical models of multiple types of network devices and defining a service chain that identifies the position of the network devices with respect to one another and connections between the network devices. In some embodiments, a method may detect a new network device becoming active on a network and identify a device type associated with the new network device becoming active. The method may further identify a logical model associated with the new network device. The method may continue by automatically programming the new network device based on the device type, the logical model, the service chain, and other devices already active in the service chain. In some embodiments, the method may activate the new network device and establish appropriate interface connections with other network devices.

Additionally, the techniques described herein may be performed by a system and/or device having non-transitory computer-readable media storing computer-executable instructions that, when executed by one or more processors, performs the method described above.

EXAMPLE EMBODIMENTS

The systems and methods described herein provide example embodiments of automatically adding a network device to a load balancer (LB) in a service chain as the backend target of the load balancer. In some embodiments, a load balancer may distribute various tasks across multiple resources, such as network devices. In some situations, this distribution of tasks across multiple resources may improve the efficiency of the network processes and operations. Additionally, one or more load balancers may improve response time and avoid or minimize the overloading of particular network devices when other network devices are available to assist with the necessary processing operations.

In some embodiments, service chaining may be used to create a chain of connected network devices or network services. As discussed herein, service chaining is a convenient way for users or customers to specify inspection of traffic via devices such as a firewall (FW), an intrusion detection system (IDS), an intrusion prevention system (IPS), transmission control protocol (TCP) optimizers, and the like. When these types of devices are included in the traffic path, they may be deployed in high availability (HA)/auto scale mode with two or more physical/virtual devices, such that one device failure does not bring down the entire traffic path. Additionally, this approach is helpful if there is a need to spin up or spin down additional devices based on the load on the network.

The described systems and methods may use service chains to automatically add and remove service functions (e.g., service functions defined in RFC 7665-Service Function Chaining (SFC) Architecture) defined as the next node to a load balancer in a service chain. In some embodiments, the described systems and methods create a backend pool with the target set as the next service function if the load balancer is not the last node in the service chain.

As used herein, service chains may also be referred to as service graphs.

In particular embodiments, a service chain may identify any number of service chain connections associated with any number of network devices. In some examples, the described systems and methods may infer server device connections using one or more service chains. The described systems can be applied in both cloud-based environments and on-premise environments.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 containing one or more computing devices, service chain components, and related systems. Environment 100 may include a computing device 102 connected to a network 104. Computing device 102 may be any type of device, such as a server, router, or other device discussed herein. Network 104 can be any type of network that has any type of network topology and uses any type of communication protocol. Computing device may interact with network 104 via a wired communication link, wireless communication link, or a combination of wired and wireless communication links.

Environment 100 may also include a service chain component 106 that can manage various device and service chain data 108, as discussed herein. The device and service chain data 108 may include one or more logical models of network devices, one or more service chain definitions, and other data used to implement the operations and functions described herein. Service chain component 106 may create and maintain any number of service chains, such as the example service chain 110 shown in FIG. 1. Service chain component 106 may also implement at least a portion of the methods discussed herein, such as methods for adding network devices to a load balancer or other system. In the example service chain 110, multiple logical models are shown for different types of network devices. For example, service chain 110 includes a first load balancer 112, a first firewall 114, a second load balancer 116, a first intrusion prevention system 118, and a third load balancer 120. The example service chain 110 shows five network devices arranged in a particular order. A particular service chain may contain any number of network devices arranged in any order.

The above-noted example is merely illustrative, and various changes may be made to achieve similar or the same results. For example, any number of components may be included in environment 100 and connected in any manner to communicate with one another.

Figure 2:
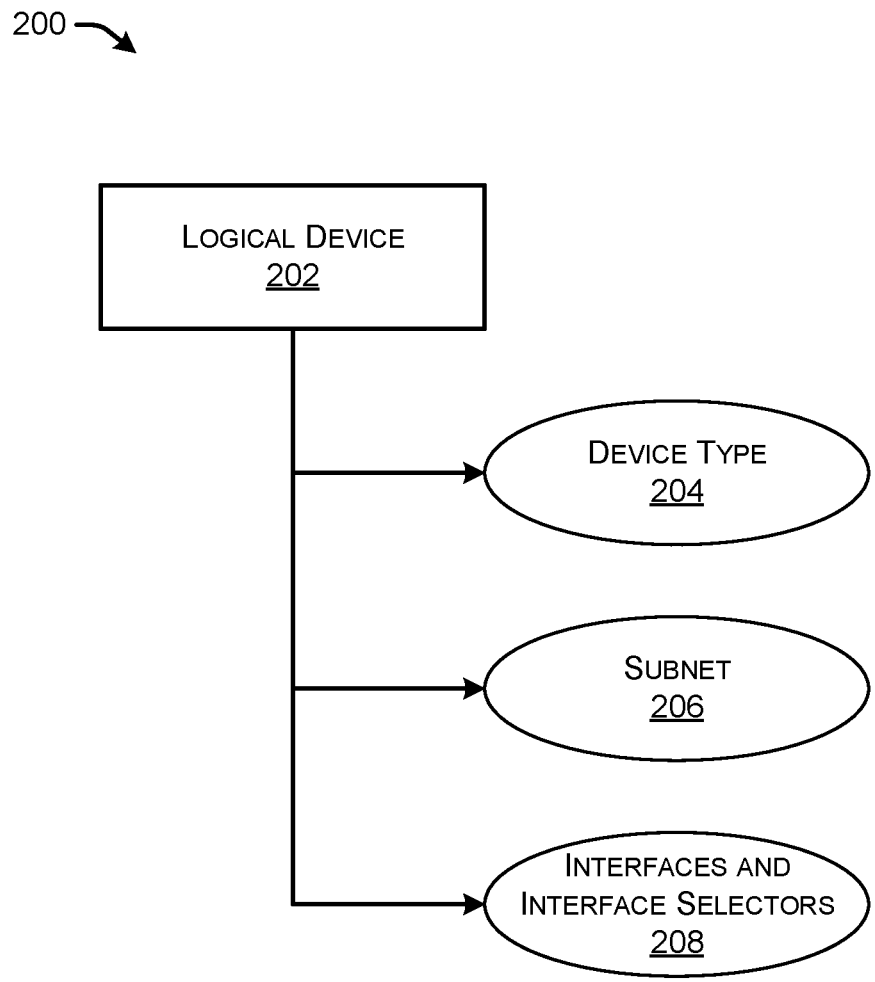
FIG. 2 illustrates a diagram of an example model for a logical device.

FIG. 2 illustrates a diagram of an example model 200 for a logical device 202. As discussed herein, the example model 200 may include a device type 204, a subnet 206, and interfaces and interface selectors 208. Example device types 204 may include a native network load balancer, a native application load balancer, a third party firewall, or a third party load balancer. For native device types 204, the example model 200 may include the subnet in which to create the logical device 202. For third party device types 204, the example model 200 may include a selector 208 that is associated with the logical device 202 to help identify the device when it is created in the cloud and to program the proper security rules for the device.

In some embodiments, a logical model of a service chain may include:
1. A list of logical devices 202 and the position of each device within the service chain
2. Consumer and a provider connectors for each logical device 202 and an option to specify redirect/NAT (Network Address Translation) and the like
3. Configuration of frontend and backend port/protocol for native load balancing devices
4. Provider EPG (endpoint group) configuration for native load balancers to help auto-populate the backend pool.

Figure 3:
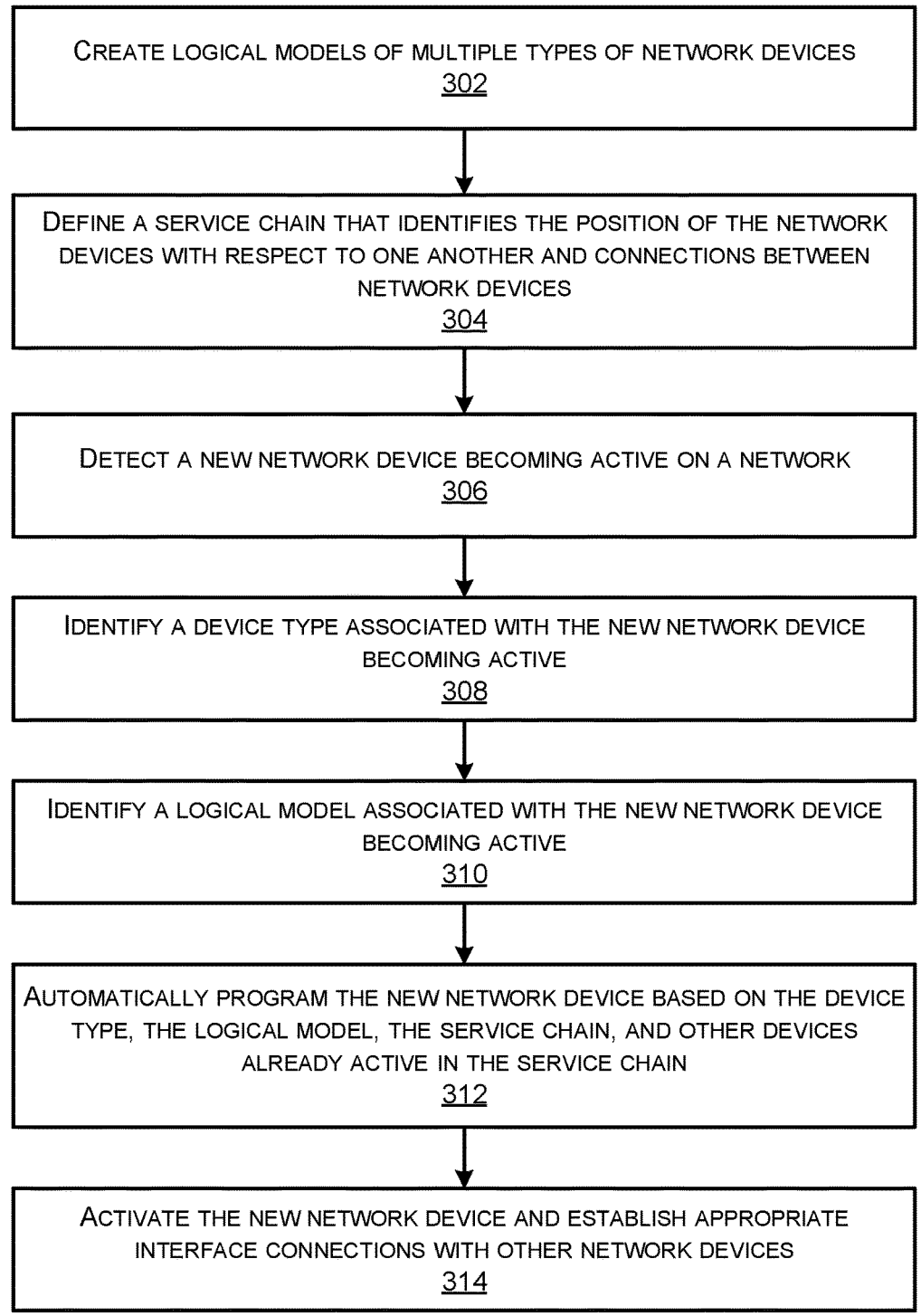
FIG. 3 illustrates a flow diagram of an example method for automatically adding network devices to a load balancer.

FIG. 3 illustrates a flow diagram of an example method 300 for automatically adding network devices to a load balancer. The operations described herein with respect to the method 300 may be performed by various components and systems, such as the components illustrated in FIG. 1.

At operation 302 of method 300, the process may create logical models of multiple types of network devices, such as the network devices used in a particular environment. The network devices may include load balancers, firewalls, intrusion prevention systems, intrusion detection systems, transmission control protocol optimizers, and the like. As discussed herein, a logical model of a network device may include a number of interfaces associated with the network device, how to identify the device (e.g., tag-based or subnet-based identifier), and the like. In some embodiments, the network device interfaces are created in the logical device definition and the connection between the devices is specified in the service chain. In particular implementations, a network administrator or other user may create the logical models discussed herein.

At operation 304 of method 300, the process may define a service chain that identifies the position of the network devices with respect to one another. The service chain may also identify connections (e.g., logical connections) between the various network devices associated with the service chain. In some embodiments, a user (e.g., a system administrator) may position the multiple network devices using a graphical user interface (GUI) or other interface, such as a "drag and drop" GUI. Once the user has positioned the network devices, the systems and methods described herein can create the service chain with the desired positioning of the multiple network devices. A particular service chain can include any number of network devices.

At operation 306 of method 300, the process may detect a new network device that is becoming active on a network. This new network device may be a newly installed device or an existing device that had been inactive and is now becoming active again on the network. In some embodiments, the systems and methods described herein can automatically identify network device interfaces associated with the new network device and automatically add interfaces to appropriate devices. For example, if the new network device is a firewall, the described systems and methods may add a firewall interface to a load balancer as part of the target for the load balancer. In some embodiments, the firewall is a logical device with one or more interfaces. In particular examples, the firewall may be created as a firewall virtual machine.

At operation 308 of method 300, the process may automatically identify a device type associated with the new network device becoming active. As discussed herein, the device type may include a load balancer, firewall, intrusion prevention system, intrusion detection system, transmission control protocol optimizer, and the like. In some examples, the device identification of operation 308 can be performed automatically without any input or interaction with a user, such as an administrator.

At operation 310 of method 300, the process may identify a logical model associated with the new network device becoming active. The identified logical model may be one of the logical models created at operation 302.

At operation 312 of method 300, the process may automatically program the new network device based on the device type, the logical model, the service chain, and other devices already active in the service chain.

In some embodiments, when a new network device, such as a Third Party Firewall or a Load Balancer, is deployed in the cloud, a cloud APIC (Application Policy Infrastructure Controller) may discover an endpoint by accessing inventory from the cloud. The cloud APIC then maps the inventory to the selectors configured on the logical device to map the device in the cloud to the correct logical device configured on the cloud APIC.

At operation 314 of method 300, the process may activate the new network device and establish appropriate interface connections with other network devices.

The operations of method 300 may continue to identify new devices that become active and activate those devices while establishing appropriate interface connections with other devices. The operations of method 300 may also identify devices that become inactive and take appropriate steps to remove the inactive device's previous connections and the like.

In some examples, when a network device becomes active, the systems and methods may read a network interface controller (NIC) internet protocol address and map it to the logical device that a user or other system created.

In some embodiments, the described systems and methods may provide notification to a system controller when a new network device, such as a firewall, is deployed. In the case of a firewall, the system controller may identify interfaces associated with the firewall, such as an internal interface and an external interface. The system controller then associates the identified interfaces with appropriate devices, such as a first load balancer and a second load balancer.

In some embodiments, the described systems and methods can create a backend pool with the target set as the next service function if the load balancer is not the last node in the service chain. In the example service chain 110 shown in FIG. 1, the systems and methods may create a backend pool on load balancer 112 with the target as firewall 114. In some implementations, the backend pool on load balancer 112 may have a second firewall (not shown in FIG. 1) as a target in addition to firewall 114. Additionally, the systems and methods may create a separate backend pool on load balancer 116 with targets as intrusion prevention system 118 and a second intrusion prevention system (not shown in FIG. 1). In these embodiments, the user does not need to explicitly tag the firewall or the intrusion prevention system. Instead, the algorithm automatically learns the internet protocol address/fully qualified domain names (FQDNs) as the backend targets of the load balancer. If any of these network devices become inactive and come back up with a different internet protocol address, the systems and methods learn the new internet protocol address and modify the backend pool target information. If there are additional network devices added, the systems and methods may learn the internet protocol addresses of the new devices and adds them to the already created backend pools. As discussed herein, the position information of each network device within the service chain is used to automatically add the network devices to the backend pool.

In some embodiments, if the same service chain is stretched to different regions (e.g., in a cloud-based environment) or to different data centers (e.g., in an on-premise environment), the described systems and methods may use the location of the network device to add only the network device in that particular region or data center to the load balancer in the same region/data center.

Figure 4:
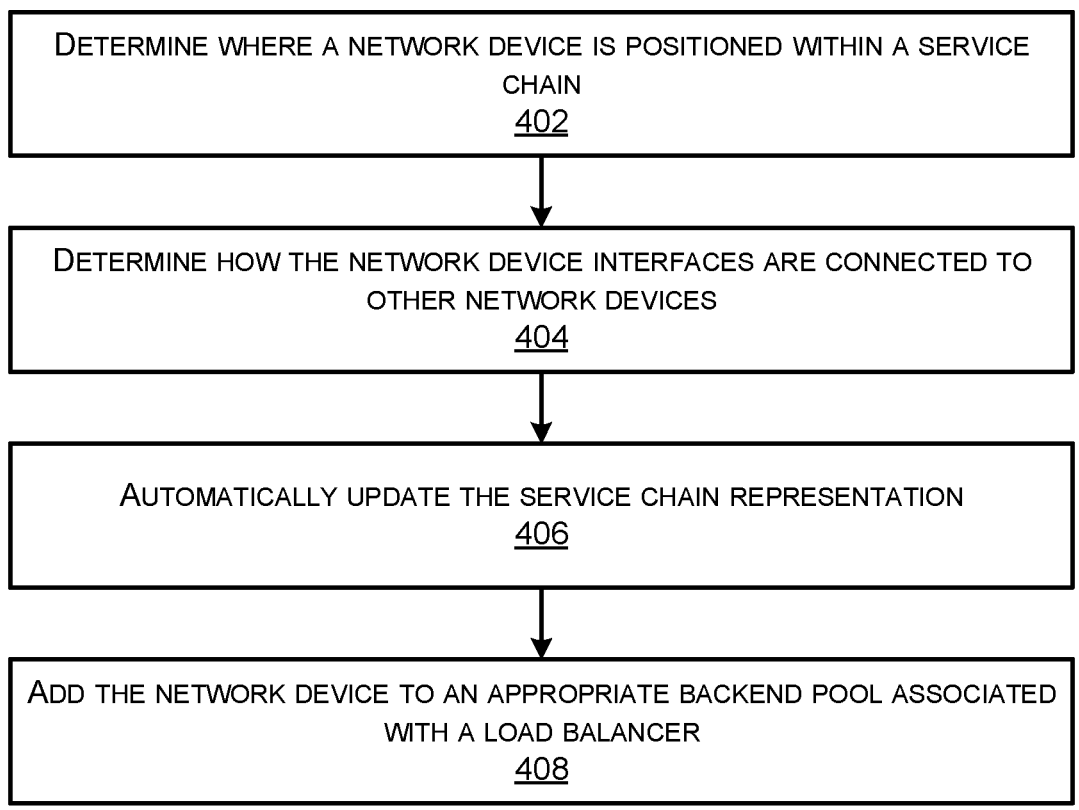
FIG. 4 illustrates a flow diagram of an example method for determining how to add a network device as a target to a load balancer.

FIG. 4 illustrates a flow diagram of an example method 400 for determining how to add a network device as a target to a load balancer. The operations described herein with respect to the method 400 may be performed by various components and systems, such as the components illustrated in FIG. 1.

At operation 402 of method 400, the process may determine where a particular network device is positioned within a service chain. For example, the position of the network device within the service chain may have been previously identified by a user or system when the service chain was defined.

At operation 404 of method 400, the process may determine how the network device interfaces are connected to other network devices. As mentioned above, the network device interfaces may be created in the logical device definition and the connection between the devices can be specified in the service chain.

At operation 406 of method 400, the process may automatically update the service chain representation to include the network device and identify the network device's connections with other devices in the service chain.

At operation 408 of method 400, the process may add the network device to an appropriate backend pool associated with a load balancer.

The operations of method 400 may be repeated as new network devices are added to an operating environment.

Figure 5:
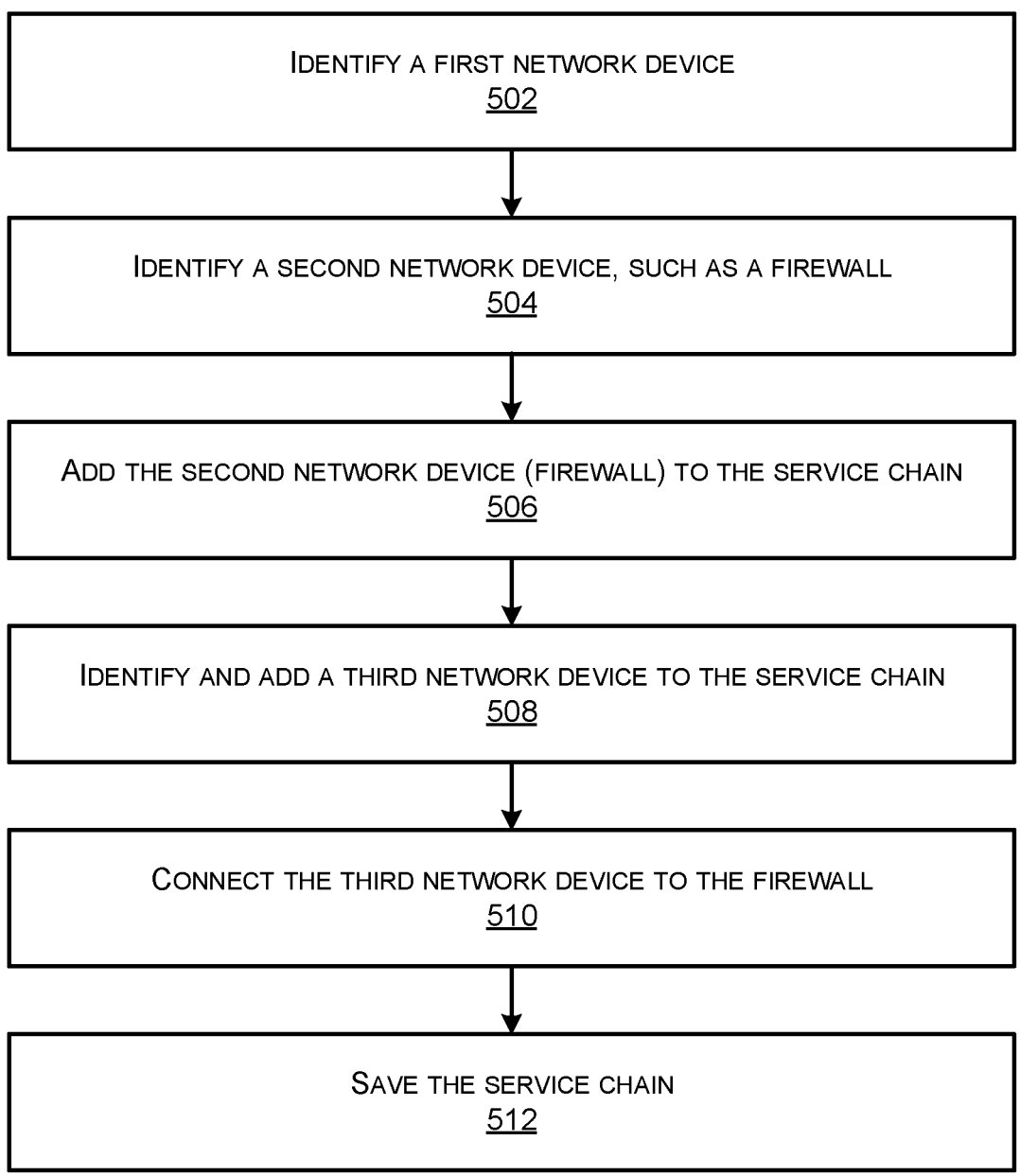
FIG. 5 illustrates a flow diagram of an example method for creating a service chain.

FIG. 5 illustrates a flow diagram of an example method 500 for creating a service chain. The operations described herein with respect to the method 500 may be performed by various components and systems, such as the components illustrated in FIG. 1. In some embodiments, a user may be involved with the identification of one or more network devices and the addition of one or more network devices to the service chain.

At operation 502 of method 500, the process may identify a first network device in an operating environment.

At operation 504 of method 500, the process may identify a second network device in the operating environment. In the example of FIG. 5, the second network device is a firewall.

At operation 506 of method 500, the process may add the second network device (e.g., the firewall) to the service chain.

At operation 508 of method 500, the process may identify and add a third network device to the service chain.

At operation 510 of method 500, the process may connect the third network device to the second network device (e.g., the firewall). For example, operation 510 may connect the third network device to the second network device based on information contained in logical models and service chain information associated with the third network device and the second network device.

At operation 512 of method 500, the process may save the service chain for future reference. For example, the saved service chain may be accessed when new network devices are added to the service chain or when existing network devices are removed from the service chain.

Various techniques may be used to position network devices within a service chain. For example, if a firewall virtual machine may be deployed in the cloud. As part of a periodic inventory read from the cloud, a cloud APIC may access the deployment information associated with the firewall virtual machine. The inventory data may include network and general information associated with the firewall virtual machine, such as the virtual machine's network interface, its IP address, the subnet, tags configured, a region of deployment, and the like.

In some embodiments, using the tag information and/or the subnet/IP address of the network interface, the cloud APIC can map the device interface to the correct logical device interface that is configured on the cloud APIC. The logical device information may include a selector for the network device interfaces. The selector can be tab-based or subnet/IP address-based. Based on the user-configured network device selector and the information accessed from the cloud, the cloud APIC performs a mapping and assigns the network interfaces of the virtual machines in the cloud to the correct logical device interface configured on the cloud APIC.

In an example implementation using a backend pool, a user configures a frontend port/protocol, a backend port, and a provider endpoint group for native load balancing devices. The provider endpoint group may tell the cloud APIC specific instances to add as targets and when they get deployed in the cloud. An example operational sequence includes:
1. A user configures a web endpoint group with a selector tag: type=web.
2. The user creates a service chain that initially includes only a network load balancer. The user configures the frontend with TCP/port 80 and configures the backend with port 8080 and adds "Web EPG" as the backend endpoint group.
3. The user then deploys the web virtual machine in the cloud with tag type=web.
4. A cloud APIC discovers the virtual machine as part of its routine inventory pull.
5. The cloud APIC then maps the network interface of this virtual machine to Web EPG based on the selector criteria for Web EPG.
6. Upon finding a new endpoint for Web EPG, the cloud APIC adds the virtual machine as the backend pool of the network load balancer. For example, the cloud APIC may add the virtual machine based on information contained in the service chain.

Figure 6:
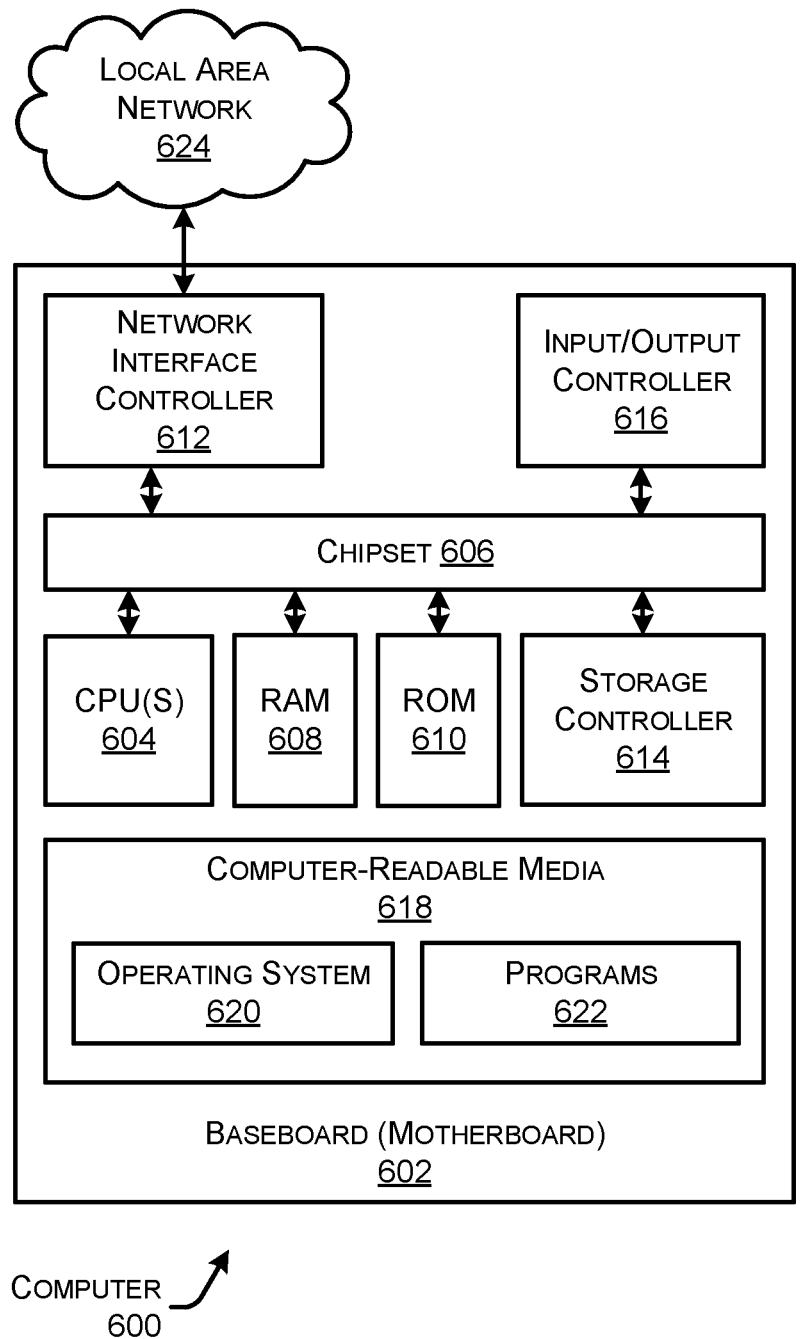
FIG. 6 is a computer architecture diagram showing an illustrative computer hardware architecture for implementing a computing device that can be utilized to implement aspects of the various technologies presented herein.

FIG. 6 shows an example computer architecture for a computer 600 capable of executing program components for implementing the functionality described herein. The computer architecture shown in FIG. 6 illustrates a conventional server computer, workstation, desktop computer, laptop, tablet, network appliance, e-reader, smartphone, or other computing device, and can be utilized to execute any of the software components presented herein. The computer 600 may, in some examples, correspond to any of the servers, routers, or other devices discussed herein. In some embodiments, computer 600 may include networked devices such as servers, switches, routers, hubs, bridges, gateways, modems, repeaters, access points, etc. Additionally, in some implementations, the programs or software discussed herein may be configured to perform operations performed by any of the devices.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 624. The chipset 606 can include functionality for providing network connectivity through a Network Interface Controller (NIC) 612, such as a gigabit Ethernet adapter. The NIC 612 is capable of connecting the computer 600 to other computing devices over the network 624. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by devices discussed herein, and or any components included therein, may be supported by one or more devices similar to computer 600. Stated otherwise, some or all of the operations performed by the systems discussed herein, and or any components included therein, may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described herein. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a router, a border router, and/or a server. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A service chain component comprising:
   one or more processors; and
   one or more non-transitory computer-readable media storing computer-executable instructions that, when executed by the one or more processors, cause the one or more processors to perform operations comprising:

defining a service chain that includes a plurality of network devices, wherein the service chain identifies a position of each network device with respect to other network devices;

generating a logical model representing the service chain, the logical model representing a backend pool of a load balancer that includes a first network device and a second network device that are of a same network device type;

storing the logical model at a storage location associated with the service chain component;

detecting a new network device becoming active on a network, wherein an identity of the network device and a network location at which the new network device belongs is unknown to the service chain component;

determining, using the logical model that the identity of the new network device is the second network device in the logical model;

determining, using the identity and the logical model, that the network location at which the new network device belongs is in the backend pool of the load balancer; and based at least in part on the network location of the new network device being represented in the logical model as in the backend pool of the load balancer:

automatically adding the new network device to the backend pool as a target for the load balancer such that network traffic is communicated to the new network device by the load balancer.

2. The service chain component of claim 1, the operations further comprising:

defining, in the logical model, representations of different types of network devices, wherein the representations define a number of interfaces associated with each network device and how to identify the device.

3. The service chain component of claim 1, wherein: determining that the identity of the new network device is the second network device is further based on a network device type of the new network device and the logical model.

4. The service chain component of claim 1, wherein: the service chain further identifies connections between the plurality of network devices.

5. The service chain component of claim 1, the operations further comprising: identifying a device type associated with the new network device becoming active on the network.

6. The service chain component of claim 1, the operations further comprising: activating the new network device; and establishing appropriate interface connections with other network devices based on the service chain.

7. The service chain component of claim 1, further comprising: programming the new network device based on the service chain and other devices already active in the service chain.

8. The service chain component of claim 1, wherein: the plurality of network devices includes one or more of a load balancer, a firewall, an intrusion prevention system, an intrusion detection system, or a transmission control protocol optimizer.

9. The service chain component of claim 1, wherein: the new network device is a firewall that is added to the backend pool of the load balancer based on the logical model.

10. A method performed at least partly by a service chain component, the method comprising:

defining a service chain that includes a plurality of network devices, wherein the service chain identifies a position of each network device with respect to other network devices;

generating a logical model representing the service chain, the logical model representing a backend pool of a load balancer that includes a first network device and a second network device that are of a same network device type;

storing the logical model at a storage location associated with the service chain component;

detecting a new network device becoming active on a network, wherein an identity of the network device and a network location at which the new network device belongs is unknown to the service chain component;

determining, using the logical model that the identity of the new network device is the second network device in the logical model;

determining, using the identity and the logical model, that the network location at which the new network device belongs is in the backend pool of the load balancer; and based at least in part on the network location of the new network device being represented in the logical model as in the backend pool of the load balancer:

automatically adding the new network device to the backend pool as a target for the load balancer such that network traffic is communicated to the new network device by the load balancer.

11. The method of claim 10, further comprising: defining, in the logical model, representations of different types of network devices, wherein the representations define a number of interfaces associated with each network device and how to identify the device.

12. The method of claim 10, wherein: the service chain further identifies connections between the plurality of network devices.

13. The method of claim 10, further comprising: activating the new network device; and establishing appropriate interface connections with other network devices based on the service chain.

14. The method of claim 10, further comprising: programming the new network device based on the service chain and other devices already active in the service chain.

15. The method of claim 10, wherein: the new network device is a firewall that is added to the backend pool of the load balancer based on the logical model.

16. One or more non-transitory computer-readable media storing instructions that, when executed, cause one or more processors to perform operations comprising:

defining a service chain that includes a plurality of network devices, wherein the service chain identifies a position of each network device with respect to other network devices;

generating a logical model representing the service chain, the logical model representing a backend pool of a load balancer that includes a first network device and a second network device that are of a same network device type;

storing the logical model at a storage location associated with a service chain component;

detecting a new network device becoming active on a network, wherein an identity of the network device and a network location at which the new network device belongs is unknown to the service chain component;

determining, using the logical model that the identity of the new network device is the second network device in the logical model;

determining, using the identity and the logical model, that the network location at which the new network device belongs is in the backend pool of the load balancer; and based at least in part on the network location of the new network device being represented in the logical model as in the backend pool of the load balancer:

automatically adding the new network device to the backend pool as a target for the load balancer such that network traffic is communicated to the new network device by the load balancer.

17. The one or more non-transitory computer-readable media of claim 16, wherein: the service chain further identifies connections between the plurality of network devices.

18. The one or more non-transitory computer-readable media of claim 16, wherein the operations further comprise: activating the new network device; and establishing appropriate interface connections with other network devices based on the service chain.

19. The one or more non-transitory computer-readable media of claim 16, further comprising: programming the new network device based on the service chain and other devices already active in the service chain.

20. The one or more non-transitory computer-readable media of claim 19, wherein: the new network device is a firewall that is added to the backend pool of the load balancer based on the logical model.

* * * * *